No. 688,516. Patented Dec. 10, 1901.
M. A. HARRIS.
CHANGEABLE GEARING.
(Application filed Apr. 12, 1900.)
(No Model.) 2 Sheets—Sheet 2.
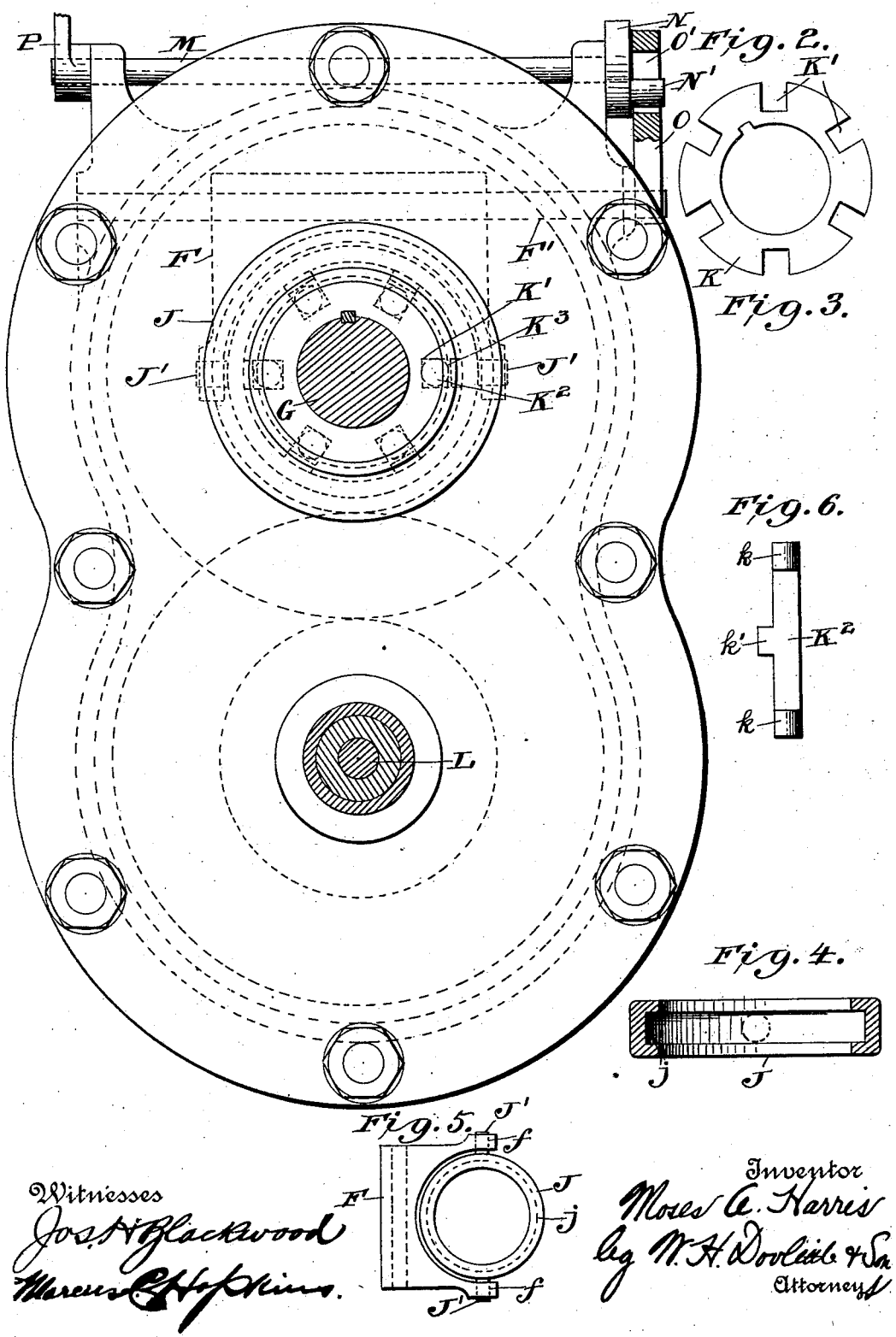

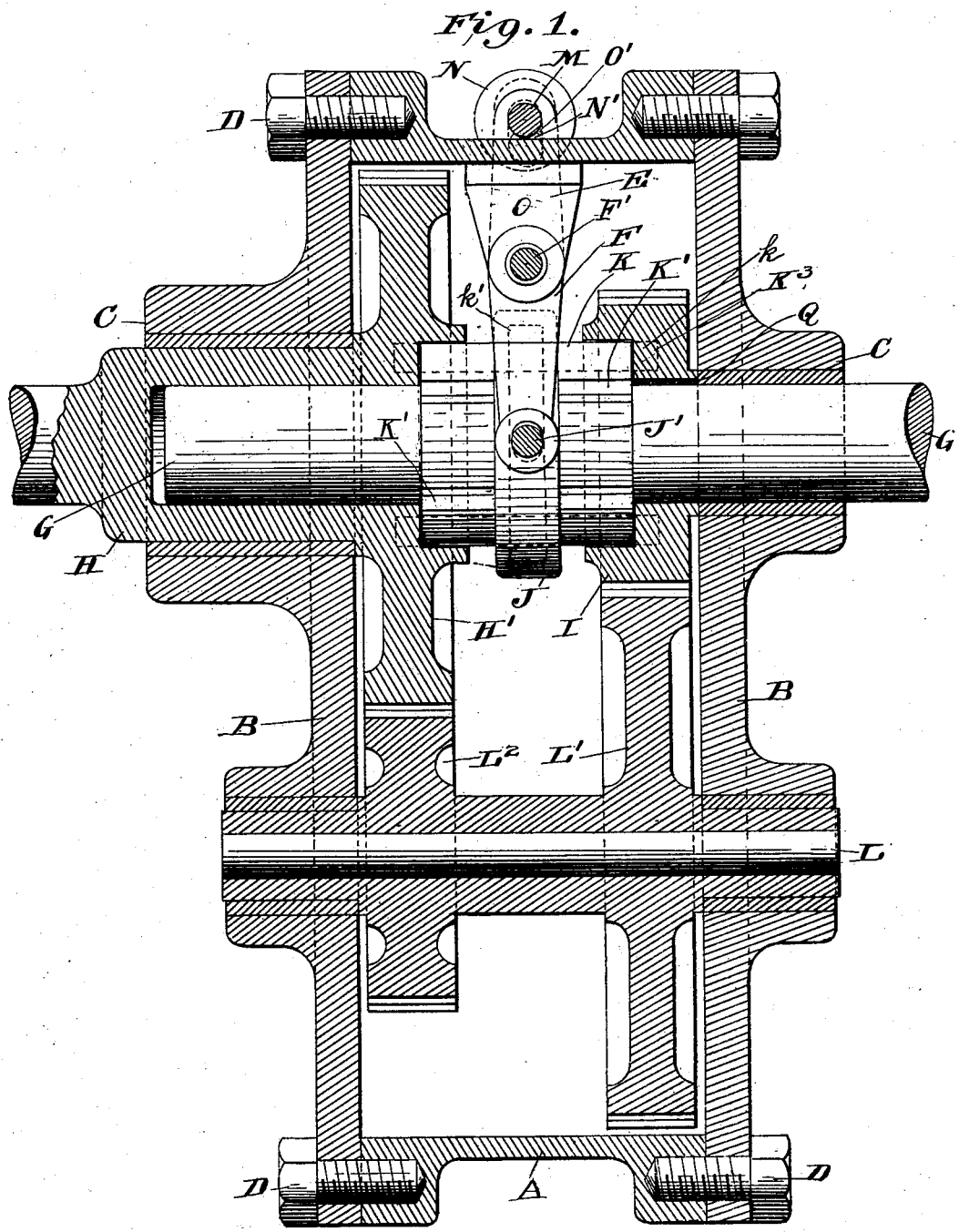

UNITED STATES PATENT OFFICE.

MOSES ALBERT HARRIS, OF NEW YORK, N. Y., ASSIGNOR TO THE H.-F. CONSTRUCTION COMPANY, OF NEW YORK, N. Y., A CORPORATION OF WEST VIRGINIA.

CHANGEABLE GEARING.

SPECIFICATION forming part of Letters Patent No. 688,516, dated December 10, 1901.

Application filed April 12, 1900. Serial No. 12,605. (No model.)

*To all whom it may concern:*

Be it known that I, MOSES ALBERT HARRIS, a citizen of the United States, residing at New York, in the county and State of New York, have invented a certain new and useful Improvement in Changeable Gearing, of which the following is a specification.

My invention relates to changeable gearing, and has for its objects to provide such a gearing capable of operation while the machinery which it governs is in motion without injury to such machinery, to make such gearing of a very simple, strong, and effective construction and applicable to various mechanisms—such as motor-vehicles, bicycles, and shop machinery—to prevent end thrust in changing gear, and to provide means to enable the engaging parts of the shifting mechanism to be readily replaced should they become broken.

Having these ends in view, my invention consists of the means and combinations hereinafter described and claimed.

My invention is illustrated in the accompanying drawings, in which—

Figure 1 is a vertical central section of the invention; Fig. 2, a similar section taken at right angles to Fig. 1; Fig. 3, a detail end view of the clutch; Fig. 4, a sectional view of shifting-ring; Fig. 5, a side view of shifting-ring and controlling-fork, and Fig. 6 a detail plan of locking-key.

Referring to the drawings, the gearing is shown as mounted in a frame A, having side standards or plates B, secured to the main part of the frame by screw-bolts D. Mounted in bearings C of the main frame is a main shaft G, which is connected with and driven by any suitable power mechanism, as a motor, engine, or the pedals of a bicycle. Mounted loosely on this shaft at one end thereof is a transmission sleeve-shaft H, which may be connected by a sprocket-wheel and chain or other suitable gearing to the machinery or vehicle to be driven. A transmission gear-wheel H' is fixed to the shaft H within the frame. Mounted loosely on the shaft G is a gear-wheel I, smaller than wheel H', provided with an inner recess Q, filled with felt soaked in oil for lubricating the shaft and keeping it clean. On a supplementary freely-running gear-shaft L, mounted in the frame, are fixed differential gears $L^2$ L', in continuous mesh with the gears H' and I, respectively. Formed on the central part of the main shaft G, between the gears H' and I, is a set-collar or fixed sleeve K. This sleeve is provided with two or more longitudinal keyways K', extending parallel to the shaft for the whole length of the sleeve. A portion of the inner circumference of each gear-wheel H' and I is cut away at its inner side to fit over and revolve on the said sleeve or collar of the shaft. In these keyways are placed removable slidable clutch-keys $K^2$, having rounded ends $k$ and a central lug or tooth $k'$. The rounded ends of the keys are adapted to be projected into and engage sockets $K^3$ in the gears H' and I. Mounted loosely on the set-collar or sleeve K of the shaft is a clutch-shifting ring J. This ring does not rotate, but is capable of moving longitudinally on the shaft sleeve or collar. The ring is provided with an internal annular recess or groove $j$, into which the lugs or teeth $k'$ of the keys project. On opposite sides the ring is provided with pins J', which are pivotally engaged by the sockets $f$ of a forked frame or bifurcated lever F. This frame is hung on a rocking shaft F', journaled in a hanger E, secured to the main frame. Secured to one end of the rocking shaft F' is a rocking-lever arm O. This arm is provided at its upper end with a vertical slot O', through which extends a pin N', fixed to a disk N. The disk N is fixed to the end of a rotatable clutch-controlling shaft M, mounted in bearings in the frame. At the opposite end of shaft M an operating-lever P is secured.

Any suitable oil-casing in which the gearing is immersed or other lubricating means may be employed.

The operation of the device is as follows: The clutch mechanism is shown in the drawings in mid-gear position, and when so placed the main shaft G and its motive power will be disconnected from the transmission-shaft H and the mechanism or vehicle to be driven. In this position of the gear the engine or motor may be started without a load. To connect the main shaft with the transmission-shaft to obtain the normal speed of the gearing, the lever P is rotated, which will turn the controlling-shaft M and rotate the disk N, whereby the disk-pin N', moving in the slot O', will oscillate the arm O to the right, rocking the shaft F'. The forked frame F will be thereby rocked to the left, carrying the ring J also to the left by its pivotal connection with the pins J' thereof. The ring by the engagement of its internal groove with the central lugs of the keys will slide the keys over into engagement with the sockets K³ of the gear-wheel H', and thereby lock said gear-wheel to the shaft G. To obtain an increase in power with decreased speed for the purpose of ascending grades or for other heavy work, the lever P is rotated in the opposite direction, which will shift the clutch-ring J to the right and carry the keys into engagement with gear I, which by its engagement with gear L' of the differential gear-wheel shaft will turn transmission-gear H' with a multiplied power.

By having the collar or boss K project into an annular recess in the adjacent face of each gear-wheel, as shown in Fig. 1, the keys K² are held in place and prevented from being thrown outward by centrifugal force or from falling outward as the main shaft goes around. The ring J will be held in the proper position to which it is moved, so as to prevent end thrust of the keys and the consequent added friction by the pin N' being on a dead-center to the arm. The pin will be held in position by the engagement of lever P with suitable stop-notches or other engaging means. Should any key become broken, it can be readily removed and replaced by a new one.

Having thus described my invention, what I claim is—

1. In a changeable gearing, the combination with a frame, a main driven shaft journaled in said frame, two differential gear-wheels loosely mounted on said main shaft, and provided with recesses therein, a boss or collar fast on said main shaft and projecting into the recess in each of said gear-wheels, the said boss or collar being provided with a plurality of longitudinal slots on the exterior thereof, differential gear-wheels journaled in said frame and meshing with the gear-wheels on the main shaft, a plurality of keys mounted in said slots and of substantially the same length as the boss or collar, each of said keys being provided with a lug projecting from the center thereof, a ring provided with an inner annular recess engaging all of said lugs, a clutch-lever connected to said ring and means for rocking said clutch-lever and thus causing all of said keys to engage in the recess in one of the gear-wheels thus causing the same to rotate with the main shaft, substantially as described.

2. In a changeable gearing, the combination with a frame, a main driven shaft journaled in said frame, two differential gear-wheels loosely mounted on said main shaft, and provided with recesses therein, a boss or collar fast on said main shaft and projecting into the recess in each of said gear-wheels, the said boss or collar being provided with a plurality of longitudinal slots on the exterior thereof, differential gear-wheels journaled in said frame and meshing with the gear-wheels on the main shaft, a plurality of keys mounted in said slots and of substantially the same length as the boss or collar, each of said keys being provided with a lug projecting from the center thereof, a ring provided with an inner annular recess engaging all of said lugs, a clutch-lever connected to said ring and a hand-lever and rock-shaft for rocking said clutch-lever and thus causing all of said keys to engage in the recess in one of the gear-wheels thus causing the same to rotate with the main shaft, substantially as described.

In testimony whereof I hereunto affix my signature in the presence of two witnesses.

MOSES ALBERT HARRIS.

Witnesses:
JOHN J. LORDAN,
LOUIS T. NOONAN.